United States Patent [19]

Wendt

[11] Patent Number: 4,704,838
[45] Date of Patent: Nov. 10, 1987

[54] ROUNDED CORNER CEILING RUNNER SYSTEM

[75] Inventor: Alan C. Wendt, Barrington, Ill.
[73] Assignee: United States Gypsum Company, Chicago, Ill.
[21] Appl. No.: 921,497
[22] Filed: Oct. 22, 1986
[51] Int. Cl.$^4$ .............................................. E04C 2/38
[52] U.S. Cl. ........................................ 52/658; 52/277;
52/239; 52/241; 52/656; 403/401
[58] Field of Search ................. 52/658, 277, 656, 657,
52/85, 238.1, 243.1, 239, 241, 242; 228/142,
173.4; 403/401

[56] References Cited

U.S. PATENT DOCUMENTS

| | | | |
|---|---|---|---|
| 2,101,349 | 12/1937 | Sharp | 52/656 |
| 2,185,904 | 1/1940 | Stowe | 52/658 |
| 2,462,199 | 2/1949 | Kehoe et al. | 52/658 |
| 2,867,302 | 1/1959 | Miller | 52/656 |
| 3,287,041 | 11/1966 | Cohen | 52/658 |
| 3,592,289 | 7/1971 | Aysta | 52/656 |
| 3,867,107 | 2/1975 | Long et al. | 52/658 |
| 3,888,059 | 6/1975 | MacLennan et al. | 52/241 |
| 3,915,328 | 10/1975 | Hawes et al. | 403/401 |
| 4,073,177 | 2/1978 | Leroux | 52/658 |

FOREIGN PATENT DOCUMENTS

| | | | |
|---|---|---|---|
| 2030891 | 7/1971 | Fed. Rep. of Germany | 52/239 |
| 2123541 | 11/1972 | Fed. Rep. of Germany | 52/656 |
| 2225605 | 11/1974 | France | 52/656 |

Primary Examiner—William F. Pate, III
Assistant Examiner—Michael Safavi
Attorney, Agent, or Firm—Robert M. Didrick; Samuel Kurlandsky; Robert H. Robinson

[57] ABSTRACT

A generally L-shaped coupling plate having an arcuate mandrel at the junction of two generally rectangular tongues is united with a notched out channel by inserting the first tongue into slots defined by the web of the channel and opposed ribs spaced apart from and parallel to the web, bending the notched out portion of the channel around the mandrel, and inserting the second tongue of the plate into the slots of the bent portion of the channel as it approaches the plate. Barbs on the edges of the plate dig into the channel to secure the union of the two pieces. The channel may be painted before being bent around the plate so that a predecorated rounded corner runner may be installed at the intersection of two partitions.

1 Claim, 16 Drawing Figures

ROUNDED CORNER CEILING RUNNER SYSTEM

This invention relates to a system for forming a rounded exterior corner in a ceiling runner at the intersection of two partitions. It particularly relates to the formation of rounded corners for movable partitions.

Movable partitions typically utilize predecorated aluminum or steel channel shaped components for ceiling runners. Because of an increasing demand for rounded partition corners, a system for providing a matching predecorated runner for such corners has become necessary.

It is an object of this invention, therefore, to provide such a system.

It is a related object of this invention to provide a coupling clip which serves as a mandrel in the bending of a channel shaped runner to form a rounded corner runner encompassing the clip.

It is a related object of this invention to provide a method for forming a rounded corner runner for intersecting partitions.

These and other objects which will become apparent are ahcieved by the invention as described herein with reference to the attached drawings. In the drawings.

Figure 1:
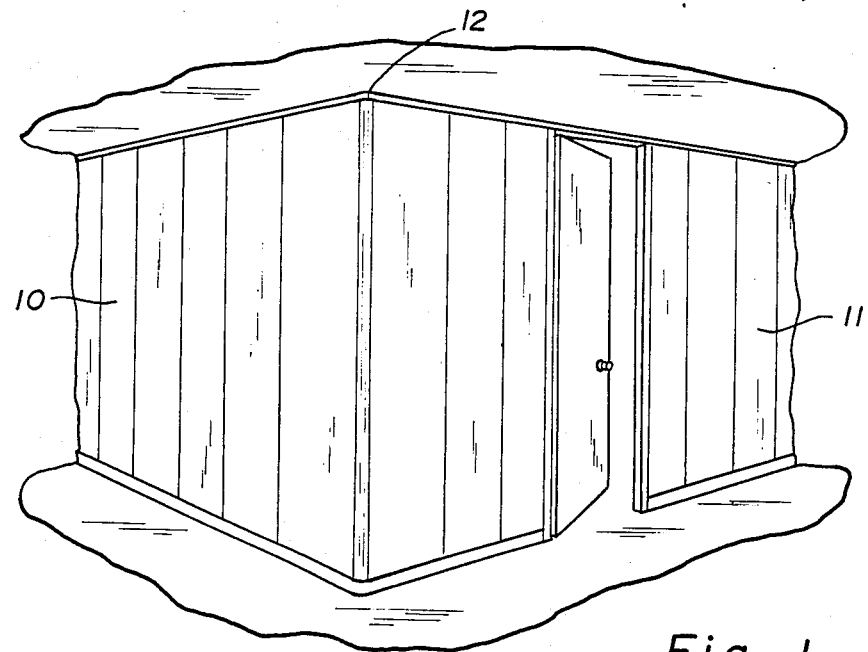
FIG. 1 is a perspective view of intersecting partitions having a rounded corner runner of this invention
Figure 2:
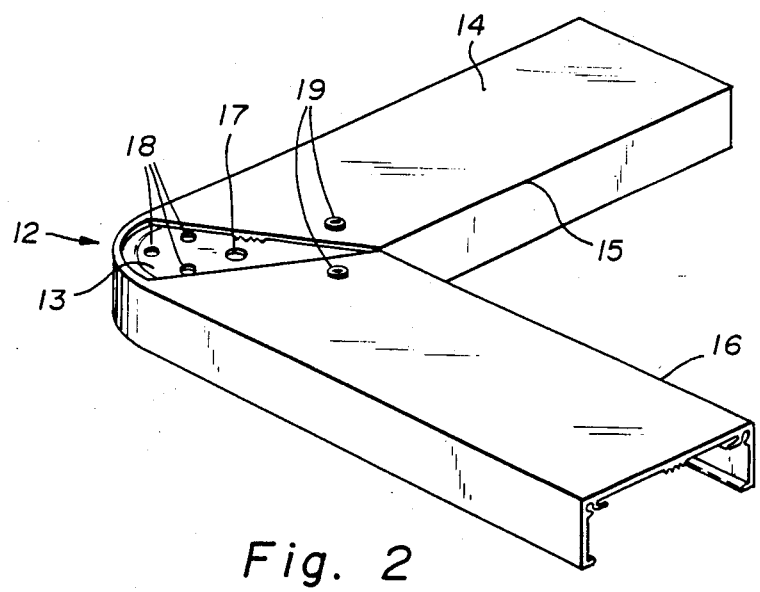
FIG. 2 is a perspective view of a rounded corner runner of this invention.
Figure 3:
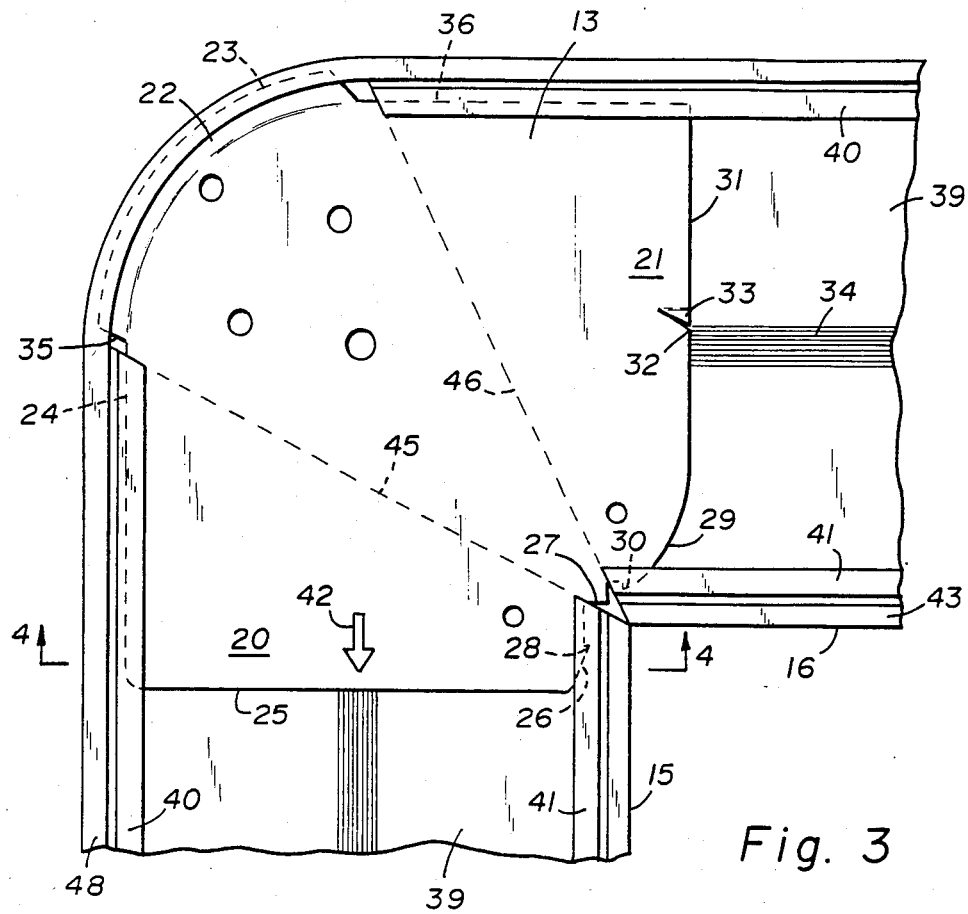
FIG. 3 is a plan view of the underside of a corner runner of this invention.

In FIG. 1, the intersecting partitions 10 and 11 are connected by the rounded corner ceiling runner 12 which is shown in FIGS. 2 and 3 to comprise the coupling plate 13 and the painted channel 14 which is bent around the plate 13 so that the legs 15 and 16 meet at a 90° angle at the interior corner. The plate 13 may be attached to a suspended ceiling grid member by a sheet metal screw extending through the hole 17. Attachment of the plate 13 to a corner stud having integral screw lugs is provided for by the holes 18. The pop rivets 19 are an optional means for fastening the channel 14 to the plate 13.

Figure 4:
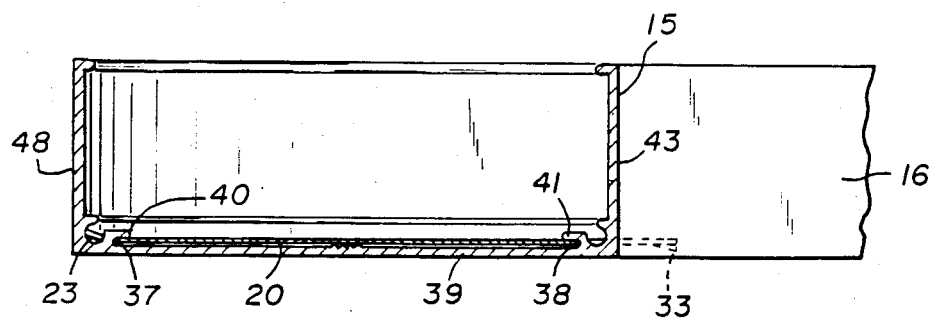
FIG. 4 is a section of the runner of FIG. 3 taken along line 4—4 of that figure.
Figure 5:
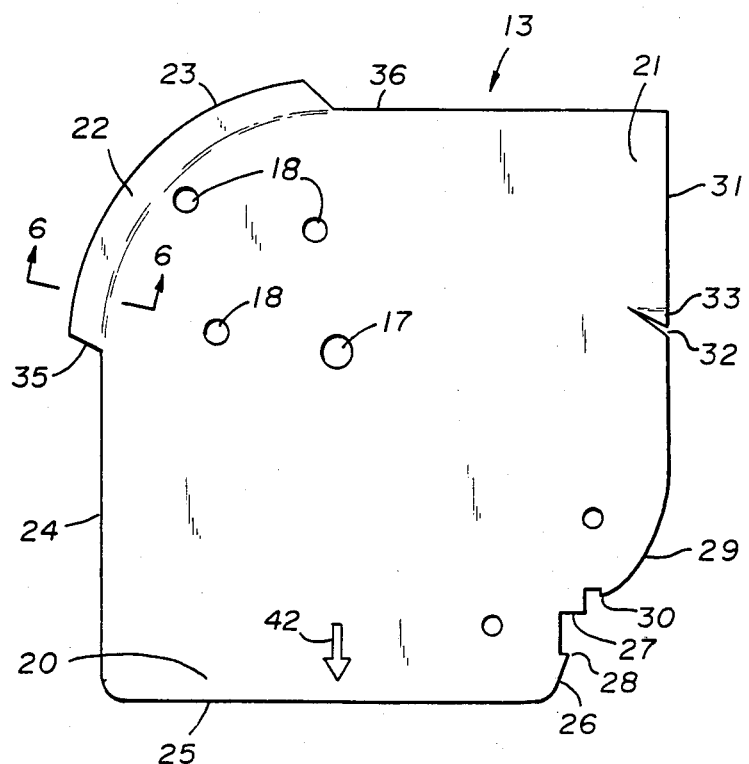
FIG. 5 is a plan view of a coupling plate of this invention.
Figure 6:
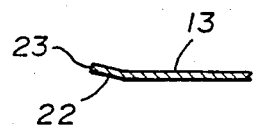
FIG. 6 is a section of the plate of FIG. 5 taken along line 6—6 of that FIGURE.
Figure 7:
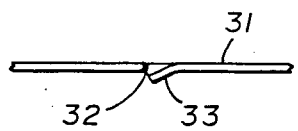
FIG. 7 is a partial end view of the right edge of the plate of FIG. 5.

In FIGS. 3, 4 and 5, the plate 13 has the generally rectangular tongues 20 and 21 and the arcuate mandrel 22, the edge 23 of which is inclined at an angle of about 15° from the horizontal as shown in FIGS. 4 and 6. The tongue 20 has an outside edge 24, a leading edge 25 and an obtuse inside edge 26 which is notched out to provide the stop 27 and the barb 28. The corner 29 of the tongue 21 is rounded to allow the leg 16 to swing past it and it is notched out to form the barb 30. The leading edge 31 of the tongue 21 is sheared at 32 and the barb 33 is bent as shown in FIG. 7 to engage the fluting 34 and lock the leg 16 into place. The angle at which the edge 35 of the mandrel 22 meets the edge 24 of the tongue 20 is 120° and the angle between the outside edge 36 of the tongue 21 and the mandrel is 135°. The tongues 20 and 21 fit into the slots 37 and 38 defined by the web 39 and the ribs 40 and 41, respectively. The embossed arrow 42 indicates that the tongue 20 is the first to be slipped into the slots 37 and 38, as shown in FIG. 11.

Figure 8:
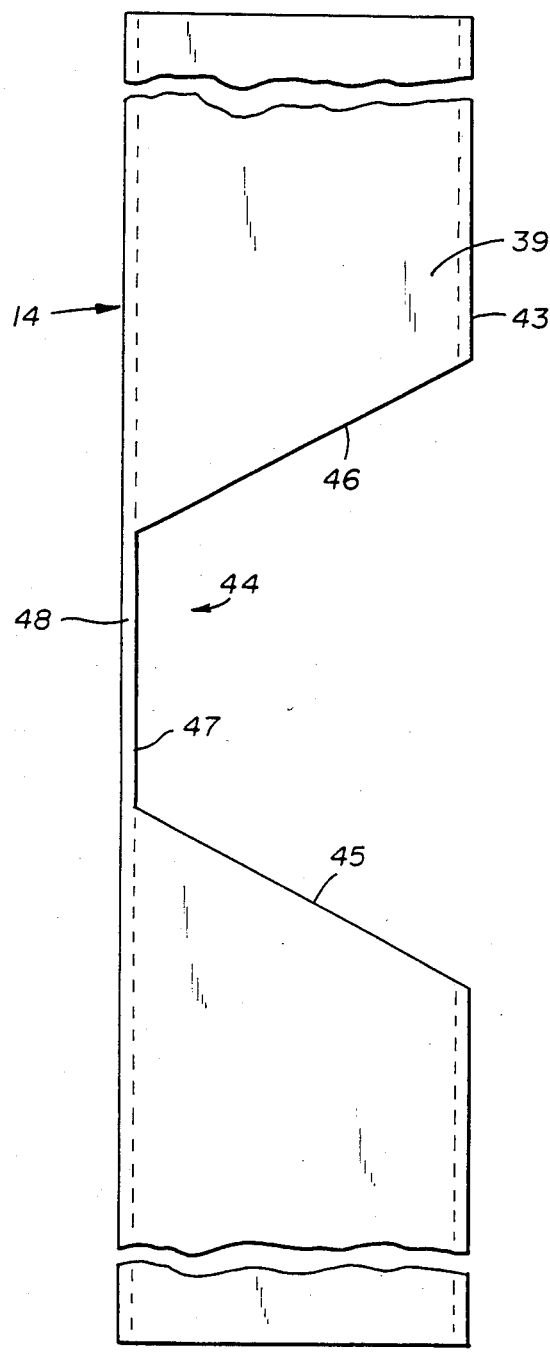
FIG. 8 is a plan view of a channel modified for this invention.

The web 39 and the interior flange 43 of the channel 14 are cut away as shown in FIG. 8 to form the truncated V-notch 44, the edges 45 and 46 of which are at an angle of about 117° to the edge 47 of the notch. The exterior flange 48 remains and is wrapped around the mandrel 22 as shown in FIGS. 11 through 16. The length of the portion of the flange 48 that wraps around the mandrel is 1.57 times the radius of curvature of the mandrel.

Figures 9, 10:
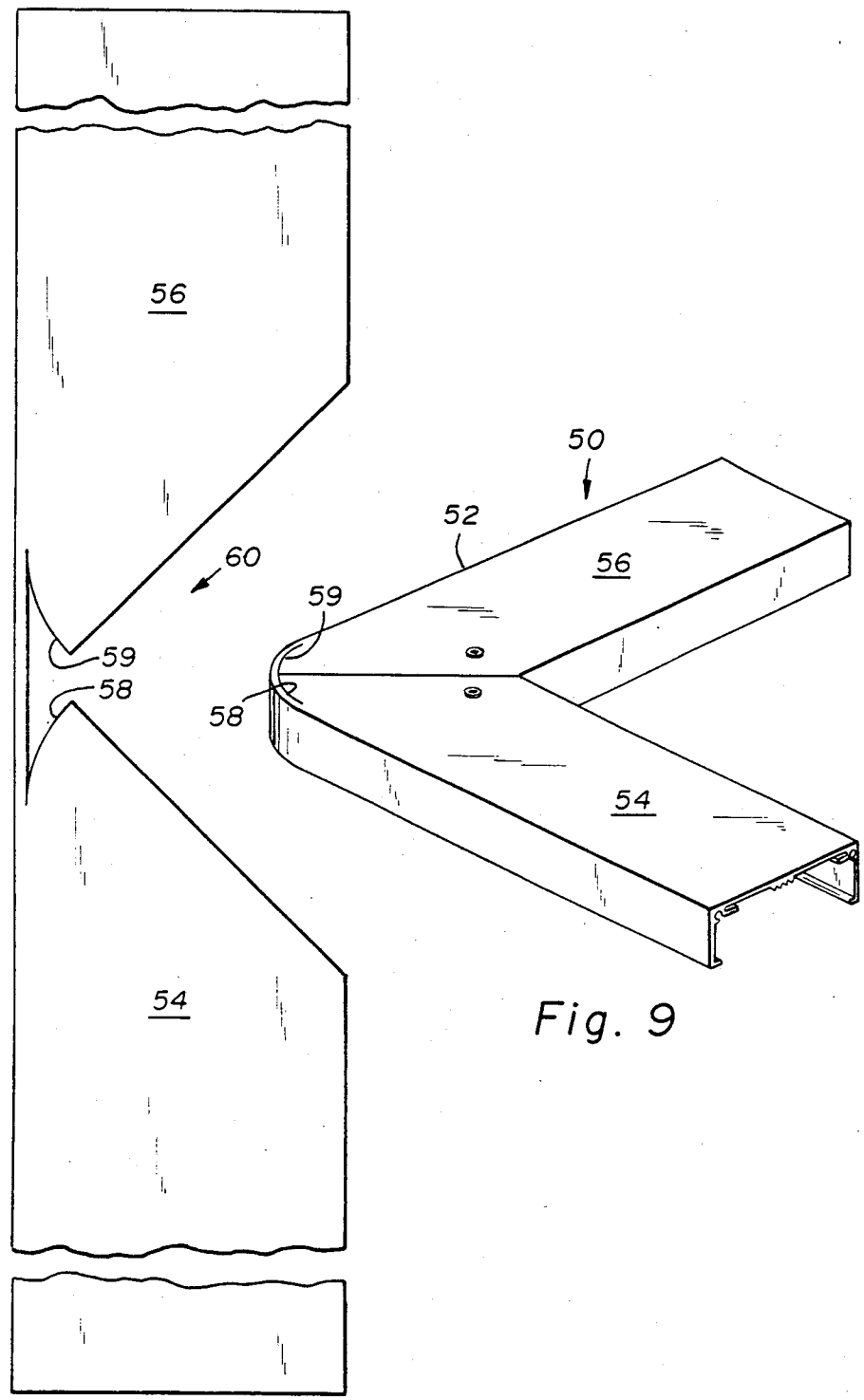
FIG. 9 is a perspective view of another corner runner of this invention.
FIG. 10 is a plan view of a channel used in the construction of the runner of FIG. 9.

In FIG. 9, the rounded corner runner 50 differs from the runner 12 in that the channel 52 completely covers the coupling plate. The legs 54 and 56 meet along the diagonal from the interior corner to the arcuate corner. The runner 50 is preferred for esthetic purposes when building a bank rail or other partition, the top of which is visible. The coupling plate 13 is unchanged but the channel 52 is sheared as shown in FIG. 10 to form the oppositely curved lips 58 and 59 at the base of the truncated V-notch 60.

Figure 11:
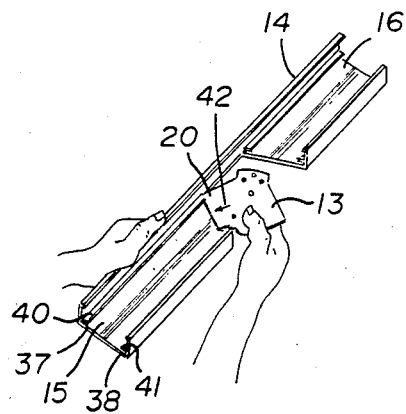
FIGS. 11 through 16 are pictorial views illustrating successive steps in the fabrication of a rounded corner runner of this invention.
Figure 12:
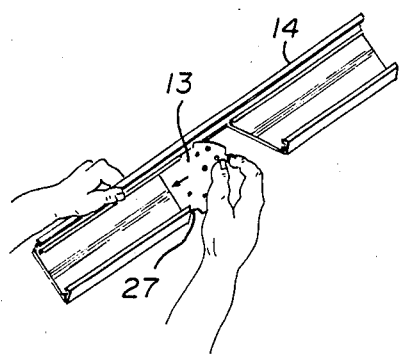
Figure 13:
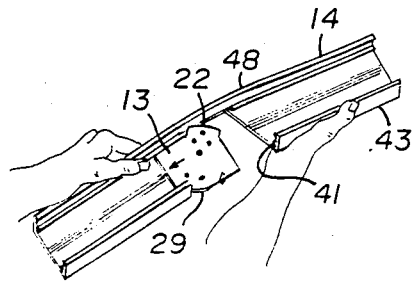
Figure 14:
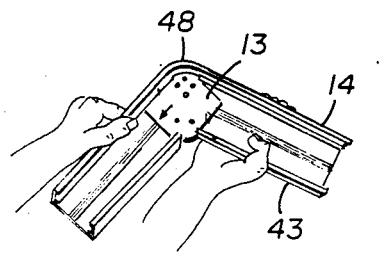
Figure 15:
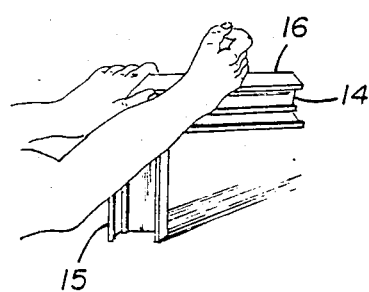
Figure 16:
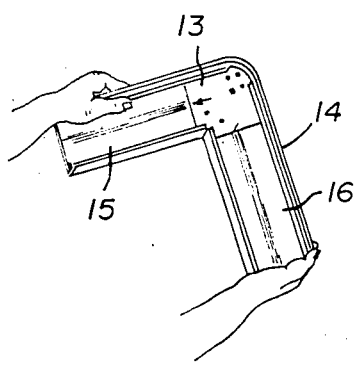

The first step in the fabrication of the rounded corner runner 12 is shown in FIG. 11, wherein the tongue 20 having the embossed arrow 42 is inserted into the slots 37 and 38 beneath the ribs 40 and 41 of the channel 14. In FIG. 12, the plate 13 is fully seated against the stop 27. In FIGS. 13 and 14, the flange 48 is wrapped around the mandrel 22 until the rib 41 begins to engage the corner 29. The leg 15 of the channel is stood on one end on a hard surface in FIG. 15 and the leg 16 is tapped to lock the assembly together. The corner runner 12 is shown in FIG. 16 without the pop rivets 19 but these can be added if additional securement is desired beyond that provided by the frictional engagement of the barbs 28 and 30 with the vertical wall of the rib 41 and of the barb 33 with the fluting 34.

It will be apparent that although the above description relates to a 90° corner, the curvature of the mandrel and its angular disposition may be changed along with the shape of the notch in the channel to accommodate an oblique corner and still be within the scope of the following claims.

The subject matter claimed is:

1. A rounded corner runner system for a partition intersection comprising:

a generally L-shaped coupling plate having first and second tongues and an arcuate mandrel projecting away from the tongues, the first tongue having an outside edge, a leading edge and an inside edge terminating at a line bisecting the plate, and the second tongue having an outside edge, a leading edge having a curved segment opposite the arcuate mandrel and a downwardly inclined barb, and an inside edge which terminates at the line bisecting the plate; and a runner having an arcuate flange and angularly opposed first and second legs joined by the arcuate flange, each leg being a channel having a web portion, an exterior flange and interior flange extending at right angles from the web, and a pair of opposed ribs spaced apart from the parallel to the web with which they form a pair of slots within the channel, the exterior flanges being continuous with the arcuate flange and the interior flanges intersecting at an angle;

wherein the first tongue of the coupling plate rests within the slots of the first leg of the runner, the arcuate flange of the runner is congruent with the arcuate mandrel of the coupling plate, the second tongue of the plate rests within the slots of the second leg of the runner and the inclined barb on the second tongue is in frictional engagement with the underside of the web of the second leg of the channel.

* * * * *